US009232377B1

(12) United States Patent
Schumacher et al.

(10) Patent No.: US 9,232,377 B1
(45) Date of Patent: Jan. 5, 2016

(54) METHOD AND SYSTEM OF DISTRIBUTING ALERTS (71) Applicant: Sprint Spectrum L.P., Overland Park, KS (US)

(72) Inventors: Gregory D. Schumacher, Holliston, MA (US); John W. Davis, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 74 days.

(21) Appl. No.: 13/662,426

(22) Filed: Oct. 27, 2012

(51) Int. Cl.
*H04M 11/04* (2006.01)
*H04W 4/22* (2009.01)
*H04H 20/71* (2008.01)

(52) U.S. Cl.
CPC ..................................... *H04W 4/22* (2013.01)

(58) Field of Classification Search
USPC ........................................................ 455/404.2
See application file for complete search history.

(56) References Cited

U.S. PATENT DOCUMENTS

| 6,745,021 | B1 | 6/2004 | Stevens | |
|---|---|---|---|---|
| 8,054,772 | B1 | 11/2011 | Upadhyay et al. | |
| 2002/0075155 | A1* | 6/2002 | Guillory | 340/601 |
| 2005/0261012 | A1* | 11/2005 | Weiser | 455/466 |
| 2006/0135058 | A1* | 6/2006 | Karabinis | 455/3.06 |
| 2009/0058665 | A1 | 3/2009 | Lamb | |
| 2009/0165065 | A1 | 6/2009 | McClenny et al. | |
| 2009/0291630 | A1* | 11/2009 | Dunn et al. | 455/3.01 |
| 2009/0325536 | A1* | 12/2009 | McKenna et al. | 455/404.1 |
| 2009/0325538 | A1* | 12/2009 | Sennett et al. | 455/404.2 |
| 2010/0142438 | A1 | 6/2010 | Chen et al. | |
| 2011/0081883 | A1 | 4/2011 | Daly | |
| 2011/0081884 | A1 | 4/2011 | Sennett et al. | |
| 2011/0103302 | A1* | 5/2011 | Hall | 370/328 |
| 2012/0064921 | A1 | 3/2012 | Hernoud et al. | |
| 2012/0309400 | A1* | 12/2012 | Inumaru | 455/438 |
| 2013/0204517 | A1 | 8/2013 | Raju et al. | |
| 2013/0344840 | A1 | 12/2013 | Titus | |

OTHER PUBLICATIONS

U.S. Appl. No. 13/967,107, filed Aug. 14, 2013.
First Action Interview Pilot Program Pre-Interview Communication from U.S. Appl. No. 13/967,107, dated Nov. 25, 2014.
Office Action from U.S. Appl. No. 13/967,107, dated Jan. 28, 2015.
Gunduzhan, Abstract: Enhanced Geo-Targeting for CMAS (41st Conference on Broadcast Meteorology/Second Conference on Weather Warnings and Communication), 2013.
Office Action from U.S. Appl. No. 13/967,107, dated May 7, 2015.

* cited by examiner

Primary Examiner — Timothy Pham (57) ABSTRACT

After receiving an alert for distribution in a target geographic area, a wireless carrier network may identify a first set of one or more coverage areas that are entirely encompassed within the target geographic area and a second set of one or more coverage areas that are only partially encompassed within the target geographic area. In the first coverage-area set, the wireless carrier network may then broadcast the alert in a manner that directs a recipient device to output the alert regardless of the device's location. And in the second coverage-area set, the wireless carrier network may broadcast the alert in a manner that directs a recipient device to output the alert only if the device's location is encompassed within the target geographic area.

20 Claims, 6 Drawing Sheets

METHOD AND SYSTEM OF DISTRIBUTING ALERTS

BACKGROUND

Various systems exist for providing the public with alerts of information of interest, such as criminal activity (e.g., terrorist attack, child abduction, etc.), severe weather, natural disasters, and/or other events that have an impact on public safety. In the earlier days, these systems were typically designed to distribute alerts using broadcast media, such as television or radio. More recently, however, systems have been designed to distribute alerts to the public using wireless carrier networks. As one example, the Federal Communications Commissions (FCC) has established the Commercial Mobile Alert System (CMAS), which facilitates the distribution of alerts by a wireless carrier to their subscribers in the event of national emergencies ("Presidential Alerts"), emergencies where life or property is at risk ("Imminent Threat Alerts"), and/or emergencies involving missing or endangered children ("AMBER Alerts").

A typical wireless carrier network includes a number of base stations that radiate to define wireless coverage areas, such as cells and cell sectors, in which wireless communication devices (WCDs) can operate and engage in air-interface communication with the wireless carrier network. Each base station may then be coupled with equipment that provides connectivity with one or more transport networks, such as the public switched telephone network (PSTN) and/or the Internet for instance. Within this arrangement, a WCD operating in a coverage area of the wireless carrier network can thus engage in communication, via the wireless carrier network, with other WCDs operating in the wireless carrier and/or with various entities sitting outside the wireless carrier network, such as an alert provider sitting on a transport network.

OVERVIEW

Systems such as CMAS that distribute alerts using wireless carrier networks may allow for the distribution of geographically-targeted alerts to subscribers located in particular wireless coverage areas. For instance, upon receiving an alert for distribution in a target geographic area, a wireless carrier network may identify each coverage area that falls within that geographic area—including those coverage areas that only partially fall within the geographic area—and then broadcast the alert in the entirety of each such coverage area. As a result, WCDs that are located in any portion of an identified coverage area that falls outside of the target geographic area will still receive and output the alert, even though these WCD are not actually located within the target geographic area and thus not the intended recipients of the alert. This degrades the accuracy of the alert distribution system.

Disclosed herein are methods that help address this issue and thereby improve the accuracy of alert distribution systems. According to the disclosed methods, after receiving an alert for distribution in a target geographic area, a wireless carrier network may identify a first set of one or more coverage areas that are entirely encompassed within the target geographic area and a second set of one or more coverage areas that are only partially encompassed within the target geographic area. In the first coverage-area set (i.e., the fully-encompassed coverage area(s)), the wireless carrier network may then broadcast the alert in a manner that directs a recipient device to output the alert regardless of the device's location. And in the second coverage-area set (i.e., the partially-encompassed coverage area(s)), the wireless carrier network may broadcast the alert in a manner that directs a recipient device to output the alert only if the device's location is encompassed within the target geographic area.

Thus, according to the disclosed methods, only WCDs that are actually located within the target geographic area may output the alert, which improves the accuracy of alert distribution systems. Further, the disclosed methods may advantageously achieve this improved accuracy without directing all WCDs in the identified coverage areas to determine whether their location is encompassed within the target geographic area. Instead, the disclosed methods only direct WCDs located in the partially-encompassed coverage area(s) to determine whether their location is encompassed within the target geographic area, which reduces the processing on WCDs located in the fully-encompassed coverage area(s) and may also reduce the load on the wireless carrier network's control channels by obviating the need to send location data for the target geographic area to WCDs located in the fully-encompassed coverage area(s).

One embodiment of the disclosed methods may involve (a) receiving an alert for distribution in a target geographical area, (b) identifying, from a plurality of wireless coverage areas of a wireless carrier network, a first set of one or more coverage areas that are entirely encompassed within the target geographical area and a second set of one or more coverage areas that are partially encompassed within the target geographical area, (c) in the first set of one or more coverage areas, broadcasting the alert in a manner that directs a recipient device to output the alert regardless of a location of the device, and (d) in the second set of one or more coverage areas, broadcasting the alert in a manner that directs a recipient device to output the alert only if a location of the device is encompassed within the target geographic area.

The alert may take any form that serves to notify people of information of interest, such as criminal activity, severe weather, natural disasters, and/or other events that have an impact on public safety. As one example, the alert may initially be defined in a message received from an alert provider, which may include location data for the target geographic area of the alert (e.g., a geographic shape descriptor and/or geocode). The alert may take various other forms as well.

The identifying of the first and second sets of one or more coverage areas may also take various forms. In one example implementation, this feature may involve (1) comparing the location data for the target geographic area to location data for the plurality of coverage areas of the wireless carrier network (e.g., using mapping techniques and/or other algorithms) and then (2) based on the comparing, identifying a first set of the plurality of coverage areas of the wireless carrier network that are entirely located within the target geographic area and a second set of the plurality of coverage areas of the wireless carrier network that are only partially located within the target geographic area. This feature may take other forms as well.

The broadcasting of the alert may take various forms as well. In one example implementation, the broadcasting of the alert in a manner that directs a recipient device to output the alert regardless of a location of the device may involve broadcasting the alert without any location data for the target geographic area, and the broadcasting of the alert in a manner that directs each recipient device to output the alert only if a location of the device is encompassed within the target geographic area may then involve broadcasting the alert with location data for at least a portion of the target geographic region. In this implementation, the location data for at least a portion of the target geographic region may take various forms, examples of which include location data for the entire target geographical area, location data for an overlapping area between the target geographical area and a collective area of the one or more coverage areas in the second set, and/or location data for an overlapping area between the target geographical area and the coverage area in the second set in which the alert is broadcast. Thus, in line with this implementation, the method may further involve generating such location data.

In another example implementation, the broadcasting of the alert in a manner that directs a recipient device to output the alert regardless of a location of the device may involve broadcasting the alert without a flag that directs a recipient device to determine whether a location of the device is encompassed within the target geographic area, and the broadcasting of the alert in a manner that directs each recipient device to output the alert only if a location of the device is encompassed within the target geographic area may then involve broadcasting the alert with a flag that directs a recipient device to determine whether a location of the device is encompassed within the target geographic area. This flag may take various forms.

These two example implementations for broadcasting the alert may also be combined. And the broadcasting of the alert may take various other forms as well.

Also disclosed herein are various network entities configured to facilitate implementation of the disclosed methods. One embodiment of these network entities may include (a) a network communication interface configured to provide connectivity with a wireless carrier network, (b) a processing unit, (c) data storage, and (d) program instructions stored in the data storage and executable by the processing unit to carry out features described herein, such as (1) receiving the alert for distribution in the target geographical area, (2) identifying the first and second sets of one or more coverage areas, and (3) causing the wireless carrier network to broadcast the alert in the first and second sets of one or more coverage areas in the manners described herein.

Another embodiment of these network entities may include (a) a wireless communication interface that radiates to define one or more wireless coverage areas in which to serve WCDs, (b) a network communication interface configured to provide connectivity with a wireless carrier network, (c) a processing unit, (d) data storage, and (e) program instructions stored in the data storage and executable by the processing unit to carry out features described herein, such as (1) receiving the alert with data specifying that the alert is for distribution in one or both of a fully-encompassed coverage area and partially-encompassed coverage area, and (2) in response to receiving the alert with this data, broadcasting the alert in the fully-encompassed coverage and/or partially-encompassed coverage area in manners described here.

These as well as other aspects and advantages will become apparent to those of ordinary skill in the art by reading the following detailed description, with reference where appropriate to the accompanying drawings.

DETAILED DESCRIPTION

Figure 1:
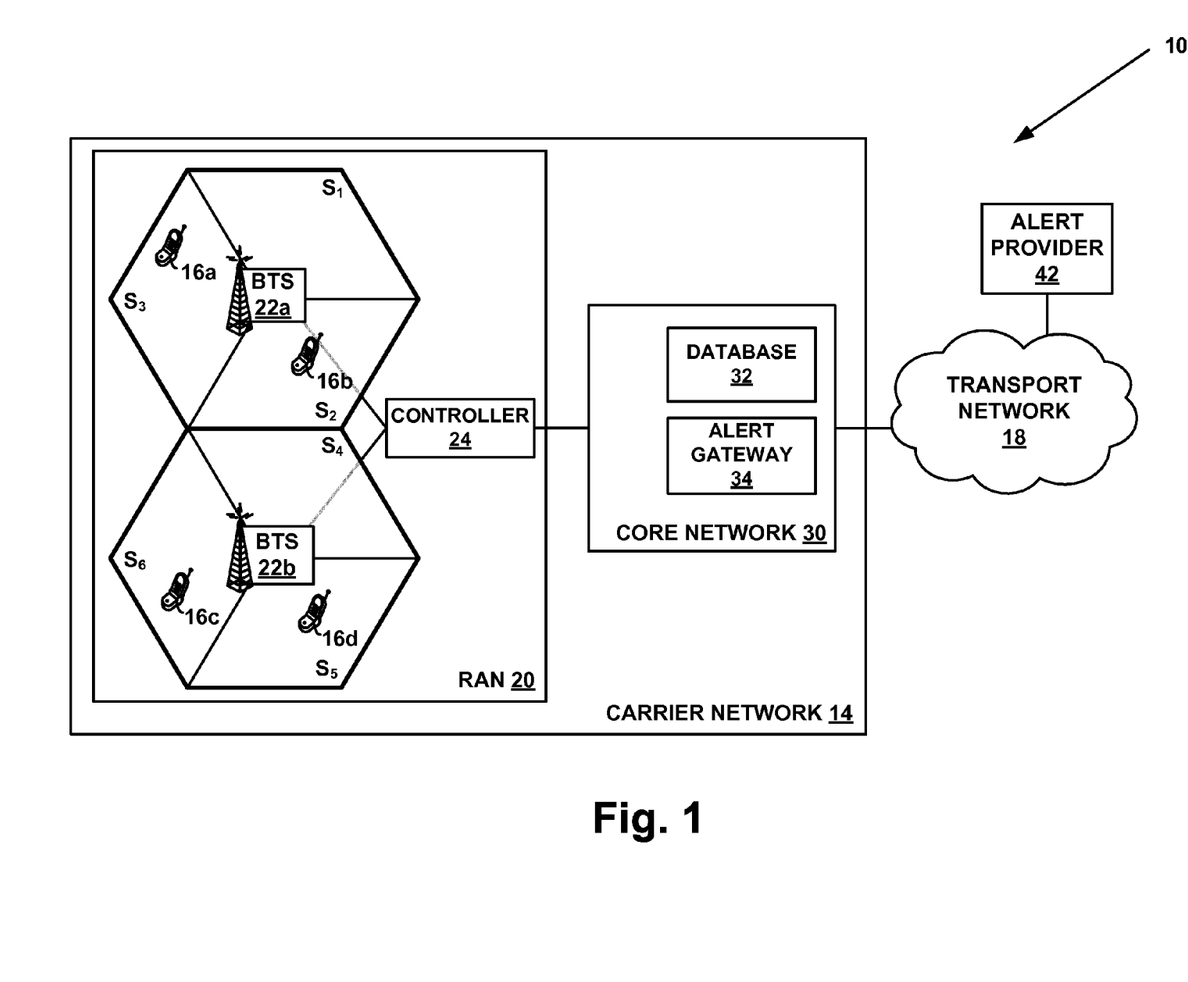
FIG. 1 is a simplified block diagram of an example communication system in which in which embodiments of the disclosed methods and entities can be implemented.

Referring to the drawings, FIG. 1 is a simplified block diagram of an example communication system 10 in which embodiments of the disclosed methods and entities can be implemented. It should be understood, however, that this and other arrangements described herein are set forth as examples only. As such, those skilled in the art will appreciate that other arrangements and elements (e.g., machines, interfaces, functions, orders of functions, etc.) can be used instead, some elements may be added, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware and/or software logic. For instance, various functions may be carried out by a processor executing instructions written in any suitable programming language and stored in memory.

FIG. 1 depicts example system 10 as including a representative wireless carrier network 14 that facilitates communication with wireless communication devices (WCDs) (e.g., cellular telephones, tablets or other wirelessly-equipped computers, mobile hotspots, etc.), such as WCDs 16a-d, and provides connectivity with one or more transport networks (e.g., the public switched telephone network (PSTN) and/or the Internet), such as transport network 18. As shown, wireless carrier network 14 may take the form of one or more radio access networks (RANs), such as example RAN 20, each of which is communicatively coupled to a core network 30. Other arrangements are possible as well.

RAN 20 may include one or more base stations (e.g., base transceiver stations, access nodes, node-Bs, eNodeBs, etc.), each of which includes an antenna arrangement and associated equipment that radiates to define one or more coverage areas (e.g., a cell and/or cell sectors) in which WCDs can operate and engage in wireless communication with RAN 20 over an air interface. For example, FIG. 1 shows RAN 20 as including at least a first base station 22a that radiates to define sectors $S_1$-$S_3$ and a second base station 22b that radiates to define sectors $S_4$-$S_6$. It should be understood, however, that the depicted arrangement of base stations and coverage areas is for purposes of illustration only, and that numerous other arrangements of base stations and coverage areas are possible as well.

In practice, base stations 22a-b and WCDs 16a-d may be arranged to communicate with each other according to an agreed air-interface protocol, examples of which include CDMA (e.g., 1xRTT or 1xEV-DO), LTE, WiMAX, IDEN, HSDPA, GSM, WI-FI, and/or any others now known or later developed. This agreed air-interface protocol may divide the air interface in each coverage area into a "forward link" (or "uplink") for carrying communications from base stations 22a-b to WCDs 16a-d and a "reverse link" (or "downlink") for carrying communications from WCDs 16a-d to base stations 22*a-b*. Further, the agreed air-interface protocol may also divide the air interface's forward and reverse link into a plurality of channels, such as shared control channels for carrying control data (e.g., pilot signal, registration messages, call-setup messages, system parameter messages, etc.) and dedicated traffic channels for carrying bearer traffic data.

RAN 20 may also include one or more controllers (e.g., a base station controller, radio network controller, etc.) that provide connectivity between base stations 22*a-b* and core network 30 and may also help to control aspects of base-station and/or air-interface operation. For example, FIG. 1 shows RAN 20 as including a separate controller 24 that is communicatively coupled to base stations 22*a-b* and provides connectivity to core network 30. In other implementations, each of base stations 22-*b* may have its own respective controller that is integrated in whole or in part with the base station. Other arrangements are possible as well.

Core network 30 may include network infrastructure that provides connectivity between RAN 20 and transport network 18 and may also help to control aspects of RAN operation. Although not shown, examples of such network infrastructure may include a mobile switching center (MSC), a message center (MC), a packet data serving node (PDSN), a serving gateway (SGW), a packet data network gateway (PGW), a mobility management entity (MME), a home location register (HLR), a home subscriber server (HSS), and the like. (It should also be understood that at least some of these components might be considered to be part of a network other than core network 30, such as RAN 20.)

As shown in FIG. 1, wireless carrier network 14 may also include a database 32 that contains data about the wireless carrier network's coverage areas. Database 32 may take the form of any server or other entity that is arranged to store this coverage-area data. For example, FIG. 1 shows database 32 as a separate entity that sits on (or is otherwise coupled to) core network 30. In an alternate example, however, one or more other network entities may be arranged to store coverage-area data for wireless carrier network 14 and thus serve as database 32. Other arrangements are possible as well.

The stored coverage-area data for wireless carrier network 14 may take various forms. As one example, the coverage-area data may include data identifying each coverage area of wireless carrier network 14, such as a cell ID, a sector ID, a carrier frequency, and/or pseudo-random noise offset for instance. As another example, the data identifying each coverage area may be correlated with data identifying particular network entities that serve the coverage area, such as an identifier of a serving base station, controller, and/or MSC for instance. As yet another example, the coverage-area data may include data specifying a location of each coverage area of wireless carrier network 14, such as a longitude/latitude coordinate of the coverage area's serving base station (or centroid), a distance of the coverage area's radius, and/or a set of longitude/latitude coordinates that define the coverage area's boundaries for instance. Other examples are possible as well.

As further shown in FIG. 1, wireless carrier network 14 may include an alert gateway 34 that functions to process alert messages received from an alert provider, such as example alert provider 42 situated on transport network 18, and to facilitate distribution of these alert messages to particular WCDs operating in wireless carrier network 14. Alert gateway 34 may take the form of any server or other entity that is arranged to carry out these functions. For example, FIG. 1 shows alert gateway 34 as a separate server that sits on (or is otherwise coupled to) core network 30. In an alternate example, however, one or more other network entities may be arranged to carry out these functions and thus serve as alert gateway 34 (including an entity that sits outside of wireless carrier network 14). Alert gateway 34 may take other forms as well.

Alert provider 42 may function to generate and/or transmit messages that contain data defining an alert intended to notify people in a target geographic area of information of interest, such as criminal activity, severe weather, natural disasters, and/or other events that have an impact on public safety. Alert provider 42 may take the form of any server or other entity that is arranged to carry out these functions. As one example, alert provider 12 may be a server or other entity operated by a national agency, such as the Department of Homeland Security, the National Weather Service, etc. As another example, alert provider 42 may be a server or other entity operated by a local agency, such as a law enforcement agency. As yet another example, alert provider 42 may be a server or other entity that functions to aggregate alerts from other alert providers, such as those described above. Alert provider 42 may take other forms as well.

The alert messages generated and/or transmitted by alert provider 42 may be formatted according to any agreed protocol, examples of which include Common Alerting Protocol (CAP), Specific Area Message Encoding (SAME), Atom Syndication Format (ATOM), Short Message Service (SMS), or any others now known or later developed. Further, the alert messages may include various data that will enable a wireless carrier network to distribute the alert to people in a target geographic area. For example, an alert message may include various data about the message itself, such as an indicator of the type, sender, and/or intended recipients of the message. As another example, an alert message may include various data about the information that is the subject of the alert, such as an indicator of the type, category, importance, severity, and/or urgency of the subject information, a textual description of the subject information, and/or a time associated with the subject information. As yet another example, an alert message may include data specifying a location of the target geographical area where the alert should be distributed, such as a geospatial shape descriptor, a geocode, and/or a textual description for the target geographical area. Other examples are possible as well.

Figure 2:
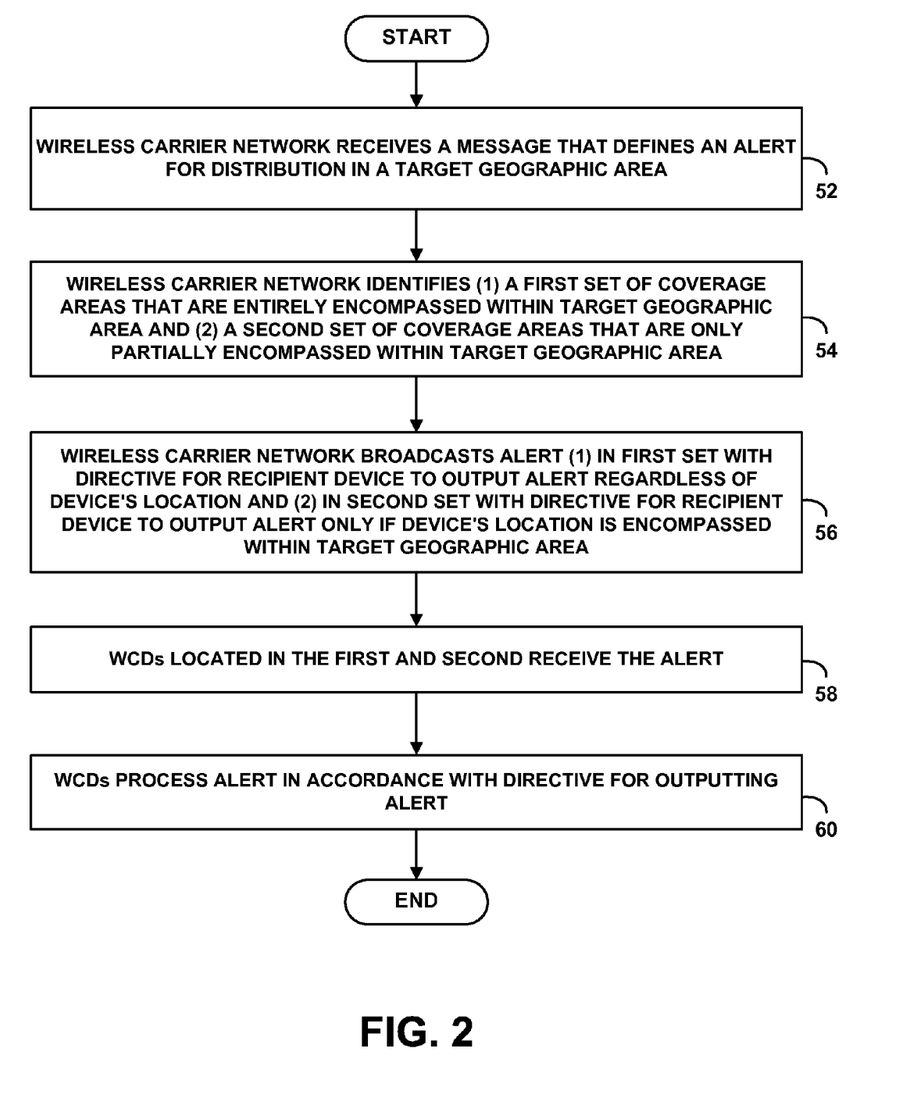
FIG. 2 is a flow chart depicting functions that can be carried out in accordance with an example embodiment of the disclosed methods.

Turning next to FIG. 2, a flow chart that depicts functions that can be carried out in accordance with an example embodiment of the disclosed methods is shown. For purposes of illustration only, these functions will be described with reference to example system 10.

Figure 3:
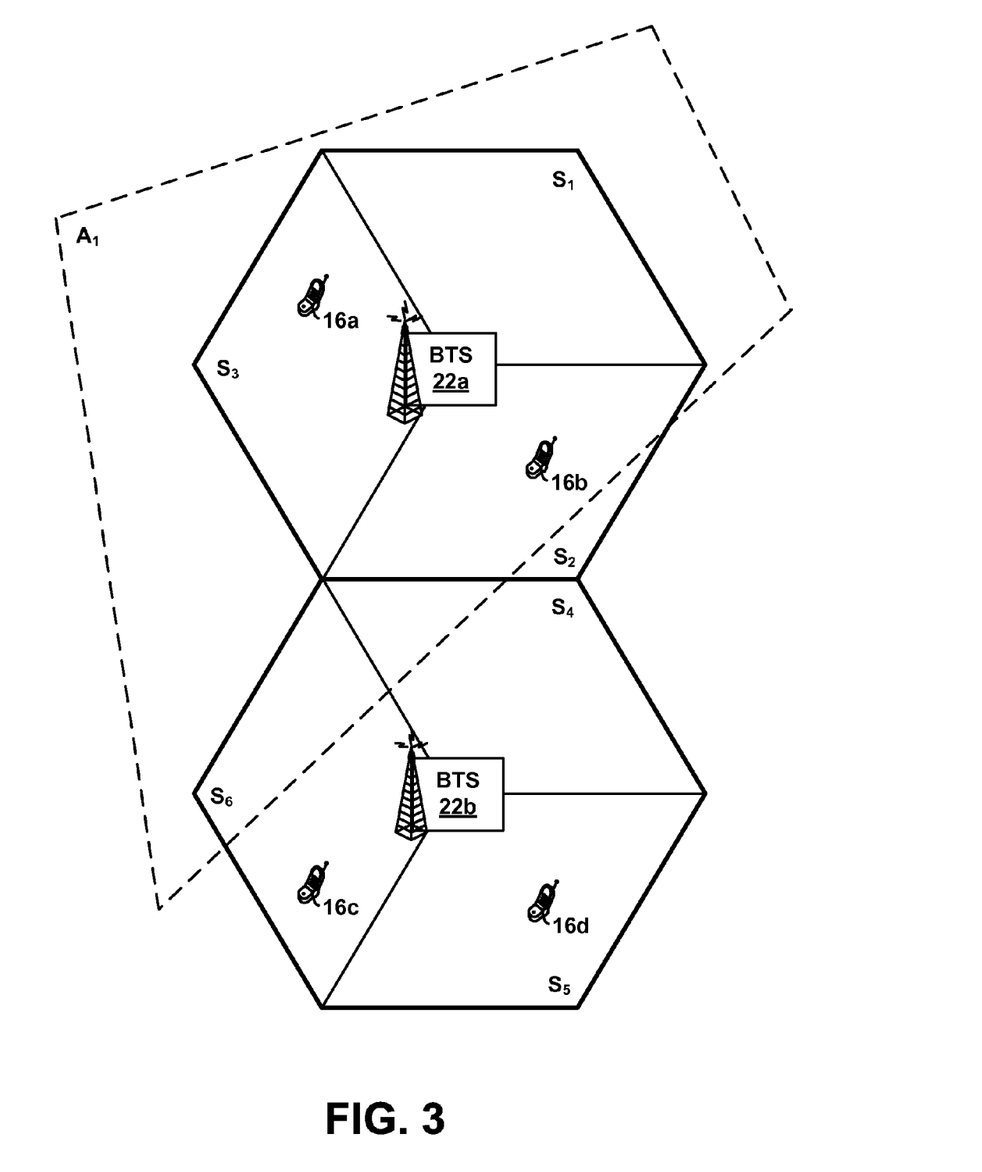
FIG. 3 depicts one possible example of a target geographic area for an alert in the example communication system of FIG. 1.

As shown in FIG. 2, the example embodiment may begin at step 52 with alert gateway 34 receiving, from alert gateway 42, a message that defines an alert for distribution in a target geographic area. In line with the discussion above, this alert message may include data specifying a location of the target geographic area, which may take various forms. As one example, the location data may take the form of a geospatial shape descriptor for the target geographic area, such as a set of latitude/longitude coordinates that define a polygon or a latitude/longitude coordinate and corresponding radius that define a circle. As another example, the location data may take the form of a geocode for the target geographic area, such as a state/county code or a zip code. Other examples exist as well. For purposes of illustration, FIG. 3 depicts one possible example of a target geographic area $A_1$ for example system 10.

At step 54, after receiving the alert message, alert gateway 34 may identify two sets of coverage areas from the wireless carrier network's plurality of coverage areas: (1) a first set of one or more coverage areas that are entirely encompassed within the target geographic area and (2) a second set of one or more coverage areas that are only partially encompassed within the target geographic area. For example, with reference to FIG. 3, alert gateway 34 may identify a first coverage-area set that includes sectors $S_1$ and $S_3$ (which are entirely located within the example target geographic area $A_1$) and a second coverage-area set that includes sectors $S_2$, $S_4$, and $S_6$ (which are only partially located within the example target geographic area $A_1$). Alert gateway 34 may carry out this identification using any technique now known or later developed.

In one example implementation, alert gateway 34 may identify the first and second coverage-area sets for the target geographic area by accessing a database that contains predefined data identifying first and second coverage-area sets for each of a plurality of known geographic areas. Such a database may be maintained by alert gateway 34 and/or some other network entity (e.g., database 32) that is accessible by alert gateway 34. Further, the data in such a database may take various forms. As one possible example, the data may take the form of geographic-area identifiers (e.g., location data such as geospatial shape descriptors and/or geocodes) that are each keyed to a first and second set of coverage-area identifiers. Other examples are possible as well.

In another example implementation, alert gateway 34 may identify the first and second coverage-area sets for the target geographic area by comparing the received location data for the target geographic area to location data for the coverage areas of wireless carrier network 14, which may be obtained from database 32. This comparison may take various forms. As one example, alert gateway 34 may perform this comparison by overlaying a map of the location data for the target geographic area with a map of the location data for the coverage areas of wireless carrier network 14 (e.g., as depicted in FIG. 3). As another example, alert gateway 34 may perform this comparison by executing, for each respective coverage area of wireless carrier network 14, an algorithm that includes as inputs the location data for the target geographic area and the location data for the respective coverage area. Other geospatial processing techniques may also be employed. Based on this comparison, alert gateway 34 may then identify a first set of coverage areas that are entirely located within the target geographic area and a second set of coverage areas that are only partially located within the target geographic area. (It should be understood that alert gateway 34 will likely also identify a third set of coverage areas that are located entirely outside the target geographic area).

As part of the identification of the first and second coverage-area sets, alert gateway 34 may also identify one or more network entities that serve each coverage area in the first and second coverage-area sets, such as a serving base station, controller, and/or MSC for instance. Alert gateway 34 may then store data defining each of the first and second coverage-area sets, which may include an indicator of the type of coverage-area set (e.g., fully- or partially-encompassed coverage areas), an identifier of each coverage area included in the coverage-area set, and perhaps an identifier of each entity identified as serving the coverage area.

At step 56, after alert gateway 34 identifies the first and second coverage-area sets, wireless carrier network 14 may (1) broadcast the alert in the first coverage-area set in a manner that directs a recipient device to output the alert regardless of the device's location and (2) broadcast the alert in the second coverage-area set in a manner that directs a recipient device to output the alert only if the device's location is encompassed within the target geographic area. These broadcasts may take various forms to define the directives for outputting the alert.

In one example implementation, the wireless carrier network's broadcasts may define the different directives for outputting the alert based on whether or not the broadcasts include location data for the geographic target area. For instance, according to this implementation, the broadcast that directs a recipient device to output the alert regardless of the device's location will not include any location data for the target geographic area. And conversely, the broadcast that directs a recipient device to output the alert only if the device's location is within the target geographic area will include location data for at least a portion of the target geographic area.

The location data included in the broadcast that directs a recipient device to output the alert based on the device's location may take various forms. In one example, the included location data may be location data for entire target geographic area, such as the location data received from alert provider 42. In an alternate example, however, the included location data may be location data for a smaller portion of the target geographic area, such as the portion that overlaps with the collective area of the second coverage-area set or the portion that overlaps with the particular coverage area in which the alert is broadcast. According to this alternate example, wireless carrier network 14 may generate and/or otherwise obtain the location data for the smaller portion(s) of the geographic target area in various manners. In one embodiment, for instance, alert gateway 34 may generate such location data at the time that it identifies the first and second coverage-area sets, using mapping techniques and/or other algorithms. In another embodiment, alert gateway 34 may obtain such location data from a database that contains predefined location data for smaller portion(s) of known geographic areas. Such a database may be maintained by alert gateway 34 and/or some other network entity (e.g., database 32) accessible by alert gateway 34. Other embodiments are possible as well.

In another example implementation, the wireless carrier network's broadcasts may define the directive for outputting the alert based on whether or not the broadcasts include a flag that directs a recipient device to determine whether its location is encompassed within the target geographic area. For instance, according to this implementation, the broadcast that directs a recipient device to output the alert regardless of the device's location will not include a flag that directs a recipient device to determine whether its location is encompassed within the target geographic area (e.g., the flag will not be set). And conversely, the broadcast that directs a recipient device to output the alert only if the device's location is encompassed within the target geographic area will include a flag that directs a recipient device to determine whether its location is encompassed within the target geographic area (e.g., the flag will be set). As one possible example, this flag may take the form of a single data bit that can have a value of 0 (e.g., not set) or 1 (e.g., set). The flag may take other forms as well.

It should be understood that the example implementations described above could be also combined. For instance, the broadcast that directs a recipient device to output the alert regardless of the device's location may include neither location data for the geographic target area nor a flag that directs a recipient device to determine whether its location is encompassed within the target geographic area. And the broadcast that directs a recipient device to output the alert only if the device's location is encompassed within the target geographic area may then include both location data for the geographic target area and a flag that directs a recipient device to determine whether its location is encompassed within the target geographic area. The broadcasts may also take other forms to define the directives for outputting the alert.

The entities of wireless carrier network 14 may work together to carry out the broadcasts of the alert in various ways. In one example implementation, alert gateway 34 may be programmed to transmit the alert and location data for the target geographic area to each base station serving at least one identified coverage area in either the first or second coverage-area set, together with data specifying which of the base station's identified coverage area(s) are included in the first or second coverage-area set. For example, with reference to the example depicted in FIG. 3, alert gateway 34 may transmit the alert and location data for the target geographic area to base station 22a along with data specifying that sectors $S_1$ and $S_3$ are part of the first coverage-area set and that sector $S_2$ is part of the second coverage-area set. And alert gateway 34 may transmit the alert and location data for the target geographic area to base station 22b along with data specifying that sectors $S_4$ and $S_6$ are part of the second coverage-area set. The act of send the alert and the location data may take various forms, and may involve communicating with one or more intermediate network entities (e.g., controller 24) that may in turn communicate with the base stations. In line with the discussion above, the location data transmitted with the alert may be, as examples, location data for the entire target geographic area or location data for a smaller portion of the target geographic area. (It should also be understood that alert gateway 34 may perform some processing on the alert before transmitting, such as reformatting the alert to comply with a different transmission protocol).

Base stations 22a-b may then each be programmed to receive the transmission from alert gateway 34, evaluate the data specifying which of the base station's coverage area(s) are included in the first or second coverage-area set to determine the manner in which the alert is to be broadcast in each such coverage area, and then broadcast the alert in each such coverage area in the appropriate manner. For example, with reference to the example depicted in FIG. 3, base station 22a may (a) broadcast the alert in sectors $S_1$ and $S_3$ in a manner that directs a recipient device to output the alert regardless of the device's location and (b) broadcast the alert in sector $S_2$ in a manner that directs a recipient device to output the alert only if the device's location is encompassed within the target geographic area. And base station 22b may broadcast the alert in sectors $S_4$ and $S_6$ in a manner that directs a recipient device to output the alert only if the device's location is encompassed within the target geographic area. In line with the discussion above, the broadcasts that direct a recipient device to output the alert only if the device's location is encompassed within the target geographic area may include location data for at least a portion of the target geographic area and perhaps a flag that directs a recipient device to determine whether its location is encompassed within the target geographic area.

In order to broadcast the alert in the appropriate manner, base stations 22a-b may be programmed to carry out various tasks to prepare the alert for broadcast. As one example, to prepare the alert for broadcast in an identified coverage area in the first coverage-area set, base stations 22a-b may be programmed to remove location data for the target geographic region from the alert. As another example, to prepare the alert for broadcast in an identified coverage area in the second coverage-area set, base stations 22a-b may be programmed to generate new location data for inclusion with the alert (e.g., location data for an overlapping area between the target geographic area and the identified coverage area). As yet another example, to prepare the alert for broadcast in an identified coverage area in the second coverage-area set, base stations 22a-b may be programmed to generate a flag for inclusion with the alert (e.g., a flag that directs a recipient device to determine whether its location is encompassed within the target geographic area). As still another example, base stations 22a-b may be programmed to perform any necessary processing on the alert in order to broadcast it according to the agreed air-interface protocol. Other examples are possible as well. (It should also be understood that other network entities, such as alert gateway 34, might carry out some or all of these tasks before the alert reaches base stations 22a-b.)

The act of broadcasting the alert in the first and second coverage-area sets may also take various forms. In one example implementation, in each coverage area in the first and second coverage-area sets, the serving base station may first transmit an indicator on a control channel regularly monitored by WCDs (e.g., a paging channel) that directs the WCDs located in the coverage area to tune to another control channel arranged for alert communications. In turn, the serving base station may then transmit the alert one or more times on the control channel arranged for alert communications. Other implementations for broadcasting the alert in the first and second coverage-area sets are possible as well.

At step 58, after wireless carrier network 14 broadcasts the alert with the different directives in the first and second coverage-area sets, WCDs located in the first and second coverage-area sets may receive the alert. For example, with reference to the example depicted in FIG. 3, WCD 16a may receive the alert with a directive to output the alert regardless of the WCD's location, and WCDs 16b-c may each receive the alert with a directive to output the alert only if the WCD's location is encompassed within target geographic area $A_1$.

At step 60, each WCD that received the alert may then process it in accordance with the received directive for outputting the alert. For instance, in accordance with the directive to output the alert regardless of the WCD's location, WCD 16a may respond to receiving the alert by simply outputting it without determining the WCD's location or evaluating whether that location is encompassed within target geographical area $A_1$. On the other hand, in accordance with the directive to output the alert only if the WCD's location is encompassed within target geographic area $A_1$, each of WCDs 16b-c may respond to receiving the alert by determining whether the WCD's location is encompassed within target geographic area $A_1$ and then only outputting the alert if so. This determination may take various forms.

In one example implementation, each of WCDs 16b-c may first determine its location using any technique now known or later developed. For example, each of WCDs 16b-c may compute its own location using technology such as Global Positioning System (GPS) and/or Assisted GPS (A-GPS). In another example, each of WCDs 16b-c may obtain its location from wireless carrier network 14, which may compute the WCD's using technology such as trilateration and/or time difference of arrival (TDOA). Other examples are possible as well. In some situations, it may also be possible that one or both of WCDs 16b-c will be unable to determine a location that is more granular than the coverage area itself (e.g., due to a lack of GPS signals). If this occurs, WCDs 16b-c will preferably be configured to output the alert.

After determining its location, each of WCDs 16b-c may then evaluate whether the determined location is encompassed within target geographical area $A_1$, which may be represented by location data for at least a portion of target geographic area $A_1$ that is included with the alert. WCDs 16b-c may perform this evaluation using any technique now known or later developed. As one example, WCDs 16b-c may perform this evaluation by mapping the location data included with the alert and then determining whether the WCD's location falls within this map. As another example, WCDs 16*b-c* may perform this evaluation by executing an algorithm that includes as inputs the WCD's location and the location data included with the alert. Various other geospatial processing techniques may also be employed.

The result of this evaluation then dictates whether each of WCDs 16*b-c* outputs the alert. For instance, with reference to the example depicted in FIG. 3, WCD 16*b* may conclude that its determined location is inside target geographical area $A_1$, which may cause WCD 16*b* to output the alert. Conversely, WCD 16*c* may conclude that its determined location is outside of target geographical area $A_1$, which may cause WCD 16*c* to suppress and/or discard the alert.

The act of outputting the alert may also take various forms. As examples, WCDs may output the alert as a textual notification and/or icon that appears in the WCD's display, a flashing light, an audio notification, and/or a vibration. Other examples may be possible as well.

Figure 4:
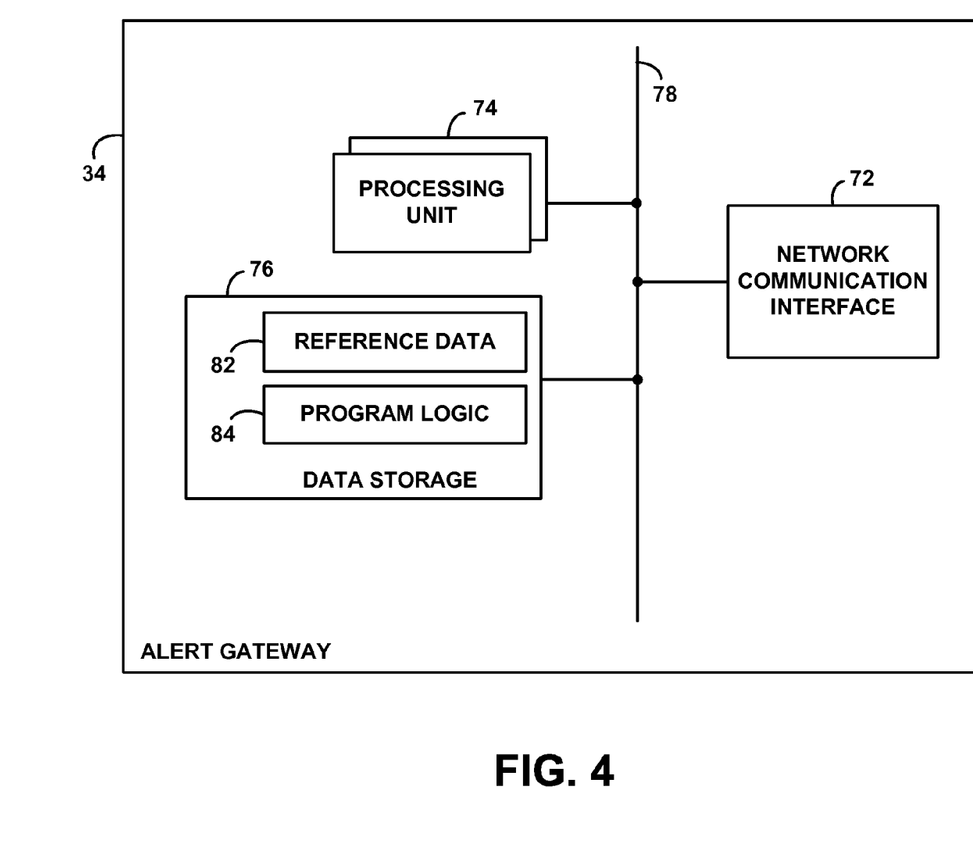
FIG. 4 is a simplified block diagram showing functional components that may be included in example alert gateway to facilitate implementation of the disclosed methods.

FIG. 4 is a simplified block diagram showing functional components that may be included in example alert gateway, such as alert gateway 34, to facilitate implementation of the disclosed methods. As shown, alert gateway 34 may include a network communication interface 72, a processing unit 74, and data storage 76, all linked together via a system bus, network, or other connection mechanism 78. Alert gateway 34 may include other components as well. (As noted above, it should be understood that some or all of these functional components may be distributed across other network entities, such as an MSC, a controller, and/or a base station).

Referring to FIG. 4, network communication interface 72 generally functions to connect alert gateway 34 with core network 14 and enable alert gateway 34 to engage in communication with various other entities, such as alert provider 42 (via transport network 18), database 32, and base stations 22*a-b* (via one or more other core-network entities and controller 24). Network communication interface 72 may take any suitable form for carrying out these functions, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 72 may also include multiple interfaces. Other configurations are possible as well.

Processing unit 74 may comprise one or more processor components, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), and/or any other processor components now known or later developed. Processing unit 74 may be integrated in whole or in part with other components of alert gateway 34.

Data storage 76 may then comprise one or more non-transitory computer readable storage mediums, such as volatile data storage mediums (e.g., random access memory (RAM), registers, and/or cache) and/or non-volatile data storage mediums (e.g., read only memory (ROM), a hard-disk drive, a solid-state drive, flash memory, and/or an optical-storage device). Data storage 76 may also be integrated in whole or in part with other components of alert gateway 34.

As shown in FIG. 4, data storage 76 may be arranged to contain reference data 82 and program logic 84. Reference data 82 may comprise various data usable by processing unit 64 to carry out various functions described herein. For example, reference data 82 may include data about the wireless carrier network's coverage areas, such as identification, location, and/or serving-entity data for the coverage areas, which alert gateway 34 may obtain from database 32 and/or in some other manner. As another example, reference data 82 may include alerts and other associated data (e.g., location data for a target geographic area) received from alert provider 42. Other examples are possible as well.

Program logic 84 may then comprise machine language instructions or the like that may be executed or interpreted by processing unit 74 to carry out various functions described herein. For example, program logic 84 may be executable by processing unit 74 to (a) receive a message that defines an alert for distribution in a target geographic area, (b) identify a first set of one or more coverage areas that are entirely encompassed within the target geographic area and a second set of one or more coverage areas that are only partially encompassed within the target geographic area, (c) cause a broadcast of the alert in the first set of one or more coverage areas in a manner that directs a recipient device to output the alert regardless of the device's location, and (d) cause a broadcast of the alert in the second set of one or more coverage areas in a manner that directs a recipient device to output the alert only if the device's location is encompassed within the target geographic area. Program logic 84 may be executable by processing unit 74 to carry out various other functions as well.

Figure 5:
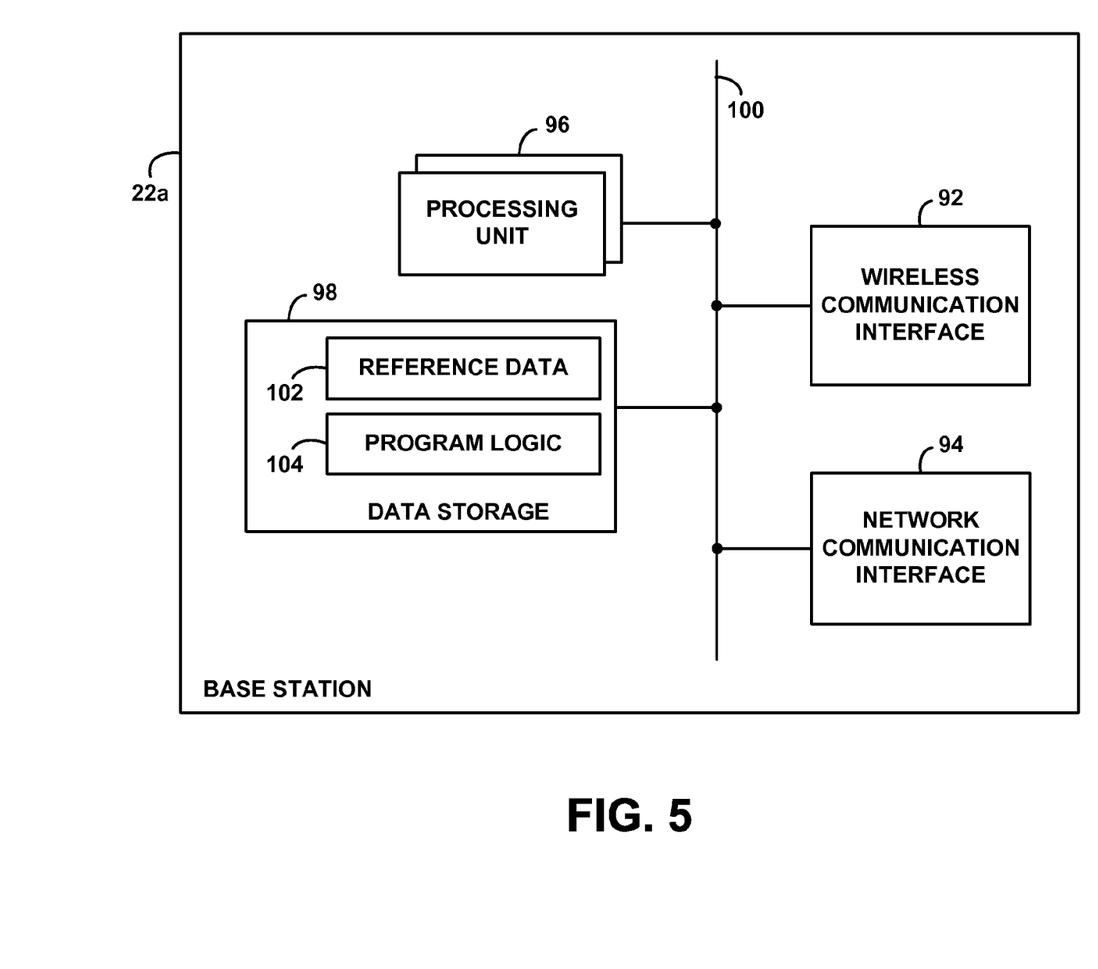
FIG. 5 is a simplified block diagram showing functional components that may be included in example base station to facilitate implementation of the disclosed methods.

FIG. 5 is a simplified block diagram showing functional components that may be included in an example base station, such as base station 22*a*, to facilitate implementation of the disclosed methods. As shown, base station 22*a* may include a wireless communication interface 92, a network communication interface 94, a processing unit 96, and data storage 98, all linked together via a system bus, network, or other connection mechanism 100. Base station 22*a* may include other components as well. (It should be understood that at least some of these functional components might be considered to be part of a controller of base station 22*a*.)

Referring to FIG. 5, wireless communication interface 92 generally functions to radiate to define one or more coverage areas, such as sectors $S_1$-$S_3$, in which WCDs can operate and engage in wireless communication with base station 22*a* over an air interface. As such, wireless communication interface 92 may include one or more antenna structures arranged in various ways (e.g., one or more directional or sectored antennas that are potentially tower mounted). Additionally, wireless communication interface 92 may include other associated components, such as a power amplifier and/or a modem for instance. Other configurations are also possible.

Network communication interface 94 generally functions to connect base station 22*a* to wireless carrier network 14 (e.g., via controller 24 and/or some other entity). Network communication interface 94 may take any suitable form for carrying out this function, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 94 may also include multiple interfaces. Other configurations are possible as well.

Processing unit 96 may comprise one or more processor components, such as general-purpose processors (e.g., a microprocessor), special-purpose processors (e.g., an ASIC or DSP), programmable-logic devices (e.g., an FPGA), and/or any other processor components now known or later developed. Processing unit 96 may be integrated in whole or in part with other components of base station 22*a*.

Data storage 98 may then comprise one or more non-transitory computer readable storage mediums, such as volatile data storage mediums (e.g., RAM, registers, and/or cache) and/or non-volatile data storage mediums (e.g., ROM, a hard-disk drive, a solid-state drive, flash memory, and/or an optical-storage device). Data storage 98 may also be integrated in whole or in part with other components of base station 22*a*.

As shown in FIG. 5, data storage 98 may be arranged to contain reference data 102 and program logic 104. Reference data 102 may comprise various data usable by processing unit 96 to carry out various functions described herein. For example, reference data 102 may include data about the base station's coverage areas, such as identification, location, and/or serving-entity data for the coverage areas. As another example, reference data 102 may include alerts and other associated data (e.g., location data for a target geographic area) received from alert gateway 34. Other examples are possible as well.

Program logic 104 may then comprise machine language instructions or the like that may be executed or interpreted by processing unit 96 to carry out various functions described herein. For example, program logic 104 may be executable by processing unit 96 to (a) receive an alert with data specifying that the alert is for distribution in one or both of (1) a coverage area that is entirely encompassed within a target geographical area of the alert and (2) a coverage area that is only partially encompassed within the target geographical area of the alert, (b) in response to receiving the alert with data specifying that the alert is for distribution in a fully-encompassed coverage area, broadcast the alert in that fully-encompassed coverage area in a manner that directs a recipient device to output the alert regardless of a location of the device and (c) in response to receiving the alert with data specifying that the alert is for distribution in a partially-encompassed coverage area, broadcasting the alert in that partially-encompassed coverage area in a manner that directs a recipient device to output the alert only if a location of the device is encompassed within the target geographic area. Program logic 104 may be executable by processing unit 96 to carry out various other functions as well.

Figure 6:
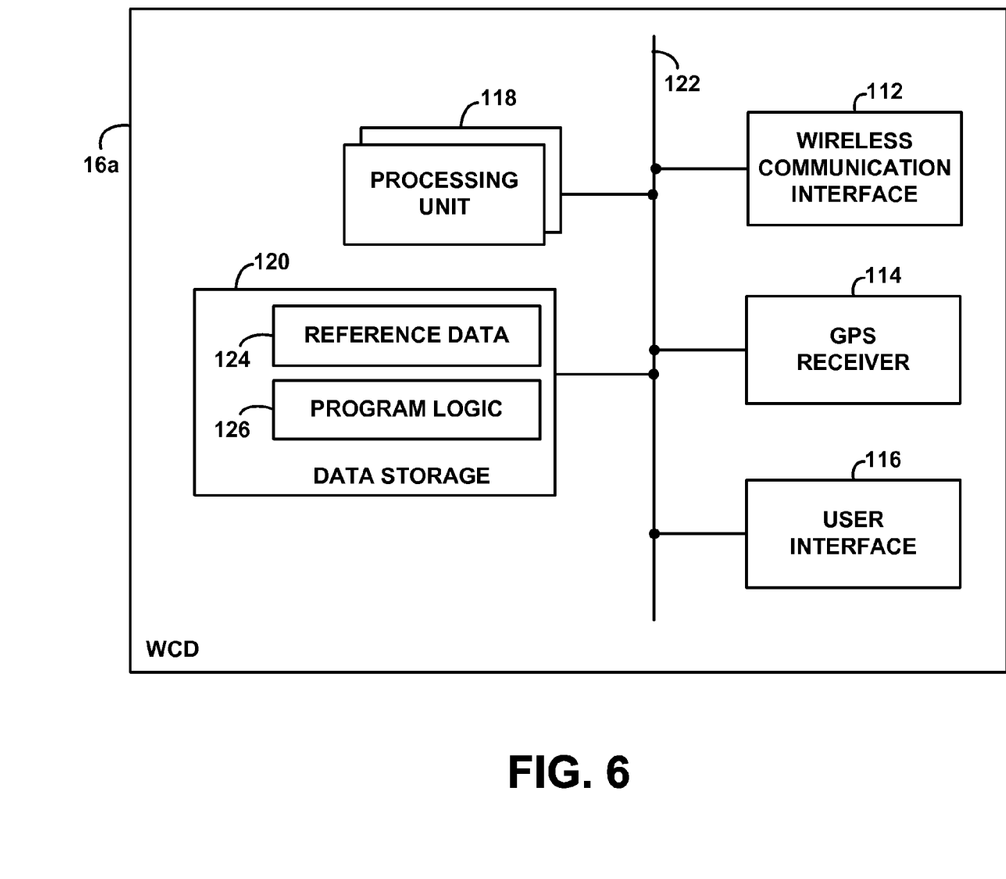
FIG. 6 is a simplified block diagram showing functional components that may be included in example wireless communication device to facilitate implementation of the disclosed methods.

FIG. 6 is a simplified block diagram showing functional components that may be included in an example WCD, such as WCD 16*a*, to facilitate implementation of the disclosed methods. As shown, example WCD 16*a* may include a wireless communication interface 112, a GPS receiver 114, a user interface 116, a processing unit 118, and data storage 120, all linked together via a system bus, network, and/or other connection mechanism 122. WCD 16*a* may include other components as well.

Referring to FIG. 6, wireless communication interface 112 generally functions to facilitate wireless communication with wireless carrier network 14 according to one or more agreed air-interface protocols, such as the example protocols mentioned above. As such, wireless communication interface 112 may include one or more antennas and a chipset that are arranged to communicate according to the one or more protocols. Wireless communication interface 112 take other forms as well.

GPS receiver 114 generally functions to receive and decode satellite-based location data that enables the determination of the WCD's location. GPS receiver 114 may take any suitable form now known or later developed for carrying out this function.

User interface 116 generally functions to facilitate user interaction with WCD 16*a*, and may thus include or provide connectivity to various components that facilitate such user interaction. For instance, user interface 116 may include or provide connectivity to input components, examples of which include a touch-sensitive screen or pad, a navigation pad, a multi-purpose button, a thumb wheel, a keyboard or keypad, a microphone, etc. Additionally, user interface 116 may include or provide connectivity to output components, examples of which include a display screen, a speaker, a headset jack, etc. Other configurations are possible as well.

Processing unit 118 may comprise one or more processor components, such as general-purpose processors (e.g., a microprocessor), application-specific processors (e.g., an ASIC or DSP), programmable logic devices (e.g., an FPGA), and/or other processor components now known or later developed. Processing unit 118 may be integrated in whole or in part with other components of WCD 16*a*.

Data storage 120 may then comprise one or more non-transitory computer-readable storage mediums, such as volatile data storage components (e.g., RAM, registers, and/or cache) and/or non-volatile data storage components (e.g., ROM, a hard-disk drive, a solid-state drive, flash memory, an optical storage device, and/or a floppy disk). Data storage 120 may also be integrated in whole or in part with other components of WCD 16*a*.

As shown in FIG. 6, data storage 120 may be arranged to contain reference data 124 and program logic 126. Reference data 124 may comprise various data usable by processing unit 118 to carry out various functions described herein. For example, reference data 124 may include an identifier of WCD 16*a*, such as one or more WCD and/or subscriber identifiers (e.g., a directory and/or serial number). As another example, reference data 124 may contain data about a coverage area in which WCD 16*a* is operating, such as an identifier of the coverage area itself, identifiers of any shared control channels in the coverage area, and identifiers of any assigned traffic channels in the coverage area. As yet another example, reference data 124 may include location data for WCD 16*a*, such as satellite-based location data received from GPS satellites, network-based location data received from wireless carrier network 14, and/or a geographic location of WCD 16*a* that has been determined based on satellite-based and/or network-based location data. Reference data 124 may include various other data as well.

Program logic 126 may then comprise machine language instructions or the like that may be executed or interpreted by processing unit 118 to carry out various functions described herein. For example, program logic 126 may be executable by processing unit 118 to (a) receive a broadcast of an alert that includes a directive for outputting the alert and (b) process the alert in accordance with this directive. Program logic 126 may be executable by processing unit 118 to carry out various other functions as well.

While example embodiments have been described above, those skilled in the art will understand that changes and modifications may be made to these embodiments without departing from the true scope and spirit of the present invention, which is defined by the claims.

We claim:

1. A method comprising:
    receiving an alert for distribution in a target geographic area;
    identifying, from a plurality of wireless coverage areas of a wireless carrier network, a first set of one or more coverage areas that are entirely encompassed within the target geographic area and a second set of one or more coverage areas that are partially encompassed within the target geographic area;
    based on the one or more coverage areas of the first set being entirely encompassed within the target geographic area, broadcasting the alert in the first set of one or more coverage areas using a first type of communication that serves to direct a recipient device to output the alert regardless of a location of the device; and based on the one or more coverage areas of the second set being partially encompassed within the target geographic area rather than being entirely encompassed within the target geographic area, broadcasting the alert in the second set of one or more coverage areas using a second type of communication that serves to direct a recipient device to output the alert only if a location of the device is encompassed within the target geographic area.

2. The method of claim 1, wherein receiving the alert comprises receiving a message that defines the alert from an alert provider.

3. The method of claim 2, wherein the message comprises location data for the target geographic area.

4. The method of claim 3, wherein the location data for the target geographic area comprises one or both of a geospatial shape descriptor and a geocode.

5. The method of claim 3, wherein identifying the first and second sets of one or more coverage areas comprises:

comparing the location data for the target geographic area to location data for the plurality of coverage areas of the wireless carrier network;

based on the comparing, identifying a first set of the plurality of coverage areas of the wireless carrier network that are entirely located within the target geographic area and a second set of the plurality of coverage areas of the wireless carrier network that are only partially located within the target geographic area.

6. The method of claim 5, wherein comparing the location data for the target geographic area to location data for the plurality of coverage areas of the wireless carrier network comprises:

overlaying a map of the location data for the target geographic area to a map of the location data for the plurality of coverage areas of the wireless carrier network.

7. The method of claim 5, wherein comparing the location data for the target geographic area to location data for the plurality of coverage areas of the wireless carrier network comprises:

for each respective coverage area of the plurality of coverage areas of the wireless carrier network, executing an algorithm that includes as inputs the location data for the target geographic area and the location data for the respective coverage area.

8. The method of claim 1, wherein:

broadcasting the alert using the first type of communication that serves to direct a recipient device to output the alert regardless of a location of the device comprises broadcasting the alert without any location data for the target geographic area, and broadcasting the alert using the second type of communication that serves to direct a recipient device to output the alert only if a location of the device is encompassed within the target geographic area comprises broadcasting the alert with location data for at least a portion of the target geographic area.

9. The method of claim 8, wherein the location data for at least a portion of the target geographic area comprises location data for the entire target geographic area.

10. The method of claim 8, wherein the location data for at least a portion of the target geographic area comprises location data for an overlapping area between the target geographic area and at least one of the one or more coverage areas in the second set.

11. The method of claim 1, further comprising:

after identifying the second set, generating location data for an overlapping area between the target geographic area and at least one coverage area of the second set.

12. The method of claim 1, wherein:

broadcasting the alert using the first type of communication that serves to direct a recipient device to output the alert regardless of a location of the device comprises broadcasting the alert without a flag that directs a recipient device to determine whether a location of the device is encompassed within the target geographic area, and broadcasting the alert using the second type of communication that serves to direct a recipient device to output the alert only if a location of the device is encompassed within the target geographic area comprises broadcasting the alert with a flag that directs a recipient device to determine whether a location of the device is encompassed within the target geographic area.

13. A network entity comprising:

a network communication interface configured to provide connectivity with a wireless carrier network;

a processing unit;

data storage; and program instructions stored in the data storage and executable by the processing unit to carry out functions comprising:

(a) receiving, via the network communication interface, an alert for distribution in a target geographic area;

(b) identifying, from a plurality of wireless coverage areas of the wireless carrier network, a first set of one or more coverage areas that are entirely encompassed within the target geographic area and a second set of one or more coverage areas that are partially encompassed within the target geographical geographic area;

(c) based on the one or more coverage areas of the first set being entirely encompassed within the target geographic area, causing the wireless carrier network to broadcast the alert in the first set of one or more coverage areas using a first type of communication that serves to direct a recipient device to output the alert regardless of a location of the device; and (d) based on the one or more coverage areas of the second set being partially encompassed within the target geographic area rather than being entirely encompassed within the target geographic area, causing the wireless carrier network to broadcast the alert in the second set of one or more coverage areas using a second type of communication that serves to direct a recipient device to output the alert only if a location of the device is encompassed within the target geographic area.

14. The network entity of claim 13, further comprising program instructions stored in the data storage and executable by the processing unit to carry out functions comprising:

after identifying the second set, generating location data for an overlapping area between the target geographic area and at least one coverage area in the second set.

15. The network entity of claim 13, wherein:

causing the wireless carrier network to broadcast the alert in the first set using the first type of communication that serves to direct a recipient device to output the alert regardless of a location of the device comprises sending to each base station of the wireless carrier network that serves at least one coverage area in the first set, via the network communication interface, a communication that causes the base station to broadcast the alert in the at least one coverage area in the first set using the first type of communication that serves to direct a recipient device to output the alert regardless of a location of the device, and causing the wireless carrier network to broadcast the alert in the second set using the second type of communication that serves to direct a recipient device to output the alert only if a location of the device is encompassed within the target geographic area comprises sending to each base station of the wireless carrier network that serves at least one coverage area in the second set, via the network communication interface, a communication that causes the base station to broadcast the alert in the at least one coverage area in the second set using the second type of communication that serves to direct a recipient device to output the alert only if a location of the device is encompassed within the target geographic area.

16. The network entity of claim 15, wherein:

the communication that causes the base station to broadcast the alert in the at least one coverage area in the first set using the first type of communication that serves to direct a recipient device to output the alert regardless of a location of the device comprises the alert and data specifying that the at least one coverage area is included in the first set, and the communication that causes the base station to broadcast the alert in the at least one coverage area in the second set using the second type of communication that serves to direct a recipient device to output the alert only if a location of the device is encompassed within the target geographic area comprises the alert, data specifying that the at least one coverage area is included in the second set, and location data for at least a portion of the target geographic area.

17. A network entity comprising:

a wireless communication interface that radiates to define one or more wireless coverage areas in which to serve wireless communication devices (WCDs);

a network communication interface configured to provide connectivity with a wireless carrier network;

a processing unit;

data storage; and program instructions stored in the data storage and executable by the processing unit to carry out functions comprising:

(a) receiving, via the network communication interface, an alert with data specifying that the alert is for distribution in one or both of (1) a coverage area that is entirely encompassed within a target geographic area of the alert and (2) a coverage area that is only partially encompassed within the target geographic area;

(b) in response to receiving the alert with data specifying that the alert is for distribution in a coverage area that is entirely encompassed within the target geographic area, broadcasting the alert in the coverage area that is entirely encompassed within the target geographic area, via the wireless communication interface, using a first type of communication that serves to direct a recipient device to output the alert regardless of a location of the device; and (c) in response to receiving the alert with data specifying that the alert is for distribution in a coverage area that is only partially encompassed within the target geographic area, broadcasting the alert in the coverage area that is only partially encompassed within the target geographic area, via the wireless communication interface, using a second type of communication that serves to direct a recipient device to output the alert only if a location of the device is encompassed within the target geographic area.

18. The network entity of claim 17, wherein:

broadcasting the alert in using the first type of communication that serves to direct a recipient device to output the alert regardless of a location of the device comprises broadcasting the alert without any location data for the target geographic area, and broadcasting the alert using the second type of communication that serves to direct each recipient device to output the alert only if a location of the device is encompassed within the target geographic area comprises broadcasting the alert with location data for at least a portion of the target geographic area.

19. The network entity of claim 18, wherein the location data for at least a portion of the target area comprises location data for an overlapping area between the target geographical geographic area and at least one coverage area in the second set.

20. The network entity of claim 18, wherein:

broadcasting the alert using the first type of communication that serves to direct a recipient device to output the alert regardless of a location of the device comprises broadcasting the alert without a flag that directs a recipient device to determine whether a location of the device is encompassed within the target geographic area, and broadcasting the alert using the second type of communication that serves to direct a recipient device to output the alert only if a location of the device is encompassed within the target geographic area comprises broadcasting the alert with a flag that directs a recipient device to determine whether a location of the device is encompassed within the target geographic area.

* * * * *